(12) United States Patent
Cha

(10) Patent No.: US 10,801,610 B2
(45) Date of Patent: Oct. 13, 2020

(54) AUTOMOTIVE TRANSMISSION

(71) Applicant: SL Corporation, Daegu (KR)

(72) Inventor: Hongjun Cha, Daegu (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 16/565,686

(22) Filed: Sep. 10, 2019

(65) Prior Publication Data

US 2020/0182348 A1 Jun. 11, 2020

(30) Foreign Application Priority Data

Dec. 11, 2018 (KR) .......................... 10-2018-0159155

(51) Int. Cl.
| | |
|---|---|
| *F16H 59/04* | (2006.01) |
| *B60K 35/00* | (2006.01) |
| *B60Q 5/00* | (2006.01) |
| *F16H 59/12* | (2006.01) |
| *B60Q 9/00* | (2006.01) |
| *F16H 59/02* | (2006.01) |

(52) U.S. Cl.
CPC ........... *F16H 59/044* (2013.01); *B60K 35/00* (2013.01); *B60Q 5/005* (2013.01); *B60Q 9/00* (2013.01); *F16H 59/12* (2013.01); *B60K 2370/1434* (2019.05); *F16H 2059/0221* (2013.01)

(58) Field of Classification Search
CPC ...... F16H 59/02; F16H 59/0204; F16H 59/04; F16H 59/08; F16H 59/12; F16H 59/044; F16H 2059/0221; F16H 2059/082; B60K 2370/1434
See application file for complete search history.

(56) References Cited

U.S. PATENT DOCUMENTS

| | | | |
|---|---|---|---|
| 9,021,911 B2 * | 5/2015 | Kim ...................... | B60K 20/02 74/473.12 |
| 2007/0144294 A1 * | 6/2007 | Sickart ................ | F16H 59/0204 74/473.18 |
| 2014/0022070 A1 * | 1/2014 | Golomb ................... | B60Q 1/40 340/475 |
| 2014/0149909 A1 * | 5/2014 | Montes .................. | B60K 20/08 715/771 |
| 2014/0326096 A1 * | 11/2014 | Kim ...................... | F16H 59/105 74/473.3 |
| 2017/0120930 A1 * | 5/2017 | Ling ....................... | G06F 3/017 |

\* cited by examiner

*Primary Examiner* — Edwin A Young
(74) *Attorney, Agent, or Firm* — Nelson Mullins Riley & Scarborough LLP; Kongsik Kim, Esq.

(57) ABSTRACT

The present disclosure relates to an automotive transmission, and more particularly, to an automotive transmission capable of reducing a space required for a gear shift operation and preventing an erroneous operation. The automotive transmission includes a shift operation unit including a plurality of touch operation units, a shift operation detector configured to detect a touch operation on one of the plurality of touch operation units, and a controller configured to determine a shift stage based on the detected touch operation. The plurality of touch operation units include a first touch operation unit configured to enable selection of one of a plurality of shift stages in one of a plurality of operation modes, and a second touch operation unit configured to operate in one of the plurality of operation modes based on an operation state of the first touch operation unit.

25 Claims, 10 Drawing Sheets

FIG. 9

| PRESSURE | RESPONSE | SELECTION STATE OF SHIFT STAGE |
|---|---|---|
| BELOW REFERENCE PRESSURE | FIRST RESPONSE | SELECTION NON-COMPLETION |
| ABOVE REFERENCE PRESSURE | SECOND RESPONSE | SELECTION COMPLETION |

AUTOMOTIVE TRANSMISSION

CROSS-REFERENCE TO RELATED APPLICATION

This application claims the benefit of priority from Korean Patent Application No. 10-2018-0159155 filed on Dec. 11, 2018, which application is herein incorporated by reference in its entirety.

BACKGROUND

1. Technical Field

The present disclosure relates to an automotive transmission, and more particularly, to an automotive transmission capable of reducing a space required for a gear shift operation and preventing an erroneous operation.

2. Description of the Related Art

An automotive transmission adjusts gear ratios to constantly maintain a rotational speed of an engine based on a vehicle speed, and a driver may adjust the gear ratio of the transmission by operating a gear shift lever.

Gear shift modes of the transmission include a manual gear shift mode in which a driver changes the gear shift stage and an automatic gear shift mode in which the gear shift stage is automatically changed based on the vehicle speed when the driver selects a driving stage (D). In addition, a sports mode type transmission that performs a manual gear shift operation and an automatic gear shift operation within one transmission has been used. In the sports mode type transmission, a transmission primarily operates in the automatic gear shift mode, and also includes the manual gear shift mode along with the automatic gear shift mode, the manual gear shift mode being capable of performing the manual gear shift operation to allow the driver to increase or decrease the gear stage.

The transmission typically uses a floor type gear shift lever which is disposed between the center fascia and the console box of the vehicle. However, the floor type not only makes the movement of passengers in a vehicle interior space more inconvenient, but also limits the efficient utilization of the space of the vehicle due to the space occupied by the shift lever.

Accordingly, there is a demand for a method of securing an internal space of the vehicle by reducing the space required for the shift operation.

SUMMARY

Aspects of the present disclosure provide an automotive transmission capable of reducing a space required for a gear shift operation by enabling selection of a gear shift stage through a touch operation of a driver. Aspects of the present disclosure also provide an automotive transmission capable of preventing an erroneous operation in a touch operation for selecting a gear shift stage. However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, an automotive transmission may include a shift operation unit including a touch operation unit having a plurality of touch buttons; a shift operation detector configured to detect a touch operation on the touch operation unit; an operation mode switcher configured to enable switching between a first operation mode and a second operation mode to allow the touch operation unit to be operated for a touch operation in one of the first operation mode and the second operation mode; and a controller configured to determine a shift stage based on the detected touch operation. In particular, the first operation mode may enable selection of one of a plurality of shift stages when a point touch operation is performed on one of the plurality of touch buttons, and the second operation mode may enable selection of one of the plurality of shift stages when a drag touch operation is performed on at least two consecutive touch buttons of the plurality of touch buttons.

According to another aspect of the present disclosure, an automotive transmission may include a shift operation unit including a plurality of touch operation units; a shift operation detector configured to detect a touch operation on one of the plurality of touch operation units; and a controller configured to determine a shift stage based on the detected touch operation. In particular, the plurality of touch operation units may include a first touch operation unit configured to enable selection of one of a plurality of shift stages by at least one operation mode; and a second touch operation unit configured to operate in one of a first operation mode for displaying shift stages selectable by the first touch operation unit and a second operation mode for enabling selection of one of the plurality of shift stages.

According to the automotive transmission of the present disclosure, the following effects may be obtained. Since the gear shift stage may be selected via the touch operation, the space required for the shift operation may be reduced compared with a case where the gear shift stage is selected by a gear shift lever, thereby allowing a more effective utilization of a vehicle interior space. Further, whether or not to select the gear shift stage may be determined based on the magnitude of the pressure applied in the touch operation, thereby preventing an erroneous operation.

The effects of the present disclosure are not limited to the above-described effects and other effects which are not described herein will become apparent to those skilled in the art from the following description.

BRIEF DESCRIPTION OF THE DRAWINGS

The above and other aspects and features of the present disclosure will become more apparent by describing in detail exemplary embodiments thereof with reference to the attached drawings, in which:

FIG. 9 is a schematic view showing a selection state of a shift stage according to a pressure applied to a shift operation unit according to an exemplary embodiment of the present disclosure.

DETAILED DESCRIPTION

Figure 1:
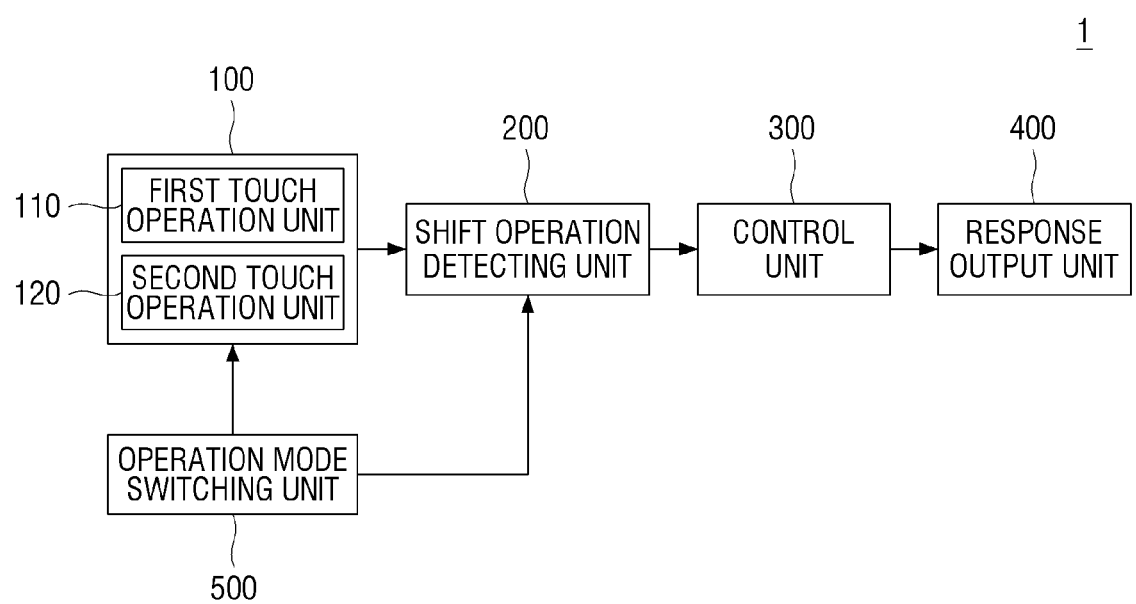
FIG. 1 is a block diagram showing a configuration of an automotive transmission according to an exemplary embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Throughout the specification, like reference numerals in the drawings denote like elements. In some embodiments, well-known steps, structures and techniques will not be described in detail to avoid obscuring the disclosure.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present disclosure are described herein with reference to plan and cross-section illustrations that are schematic illustrations of exemplary embodiments of the present disclosure. As such, variations from the shapes of the illustrations as a result, for example, of manufacturing techniques and/or tolerances, are to be expected. Thus, exemplary embodiments of the present disclosure should not be construed as limited to the particular shapes of regions illustrated herein but are to include deviations in shapes that result, for example, from manufacturing. In the drawings, respective components may be enlarged or reduced in size for convenience of explanation.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Hereinafter, an automotive transmission according to exemplary embodiments of the present disclosure will be described with reference to the drawings.

Figure 2:
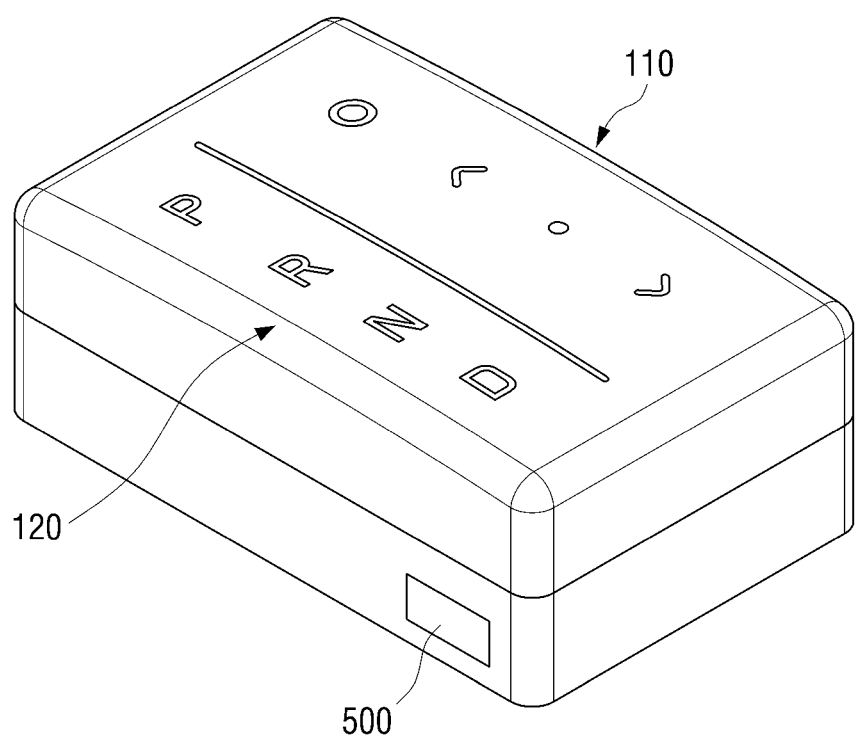
FIG. 2 is a perspective view showing an external appearance of an automotive transmission according to an exemplary embodiment of the present disclosure.
Figure 3:
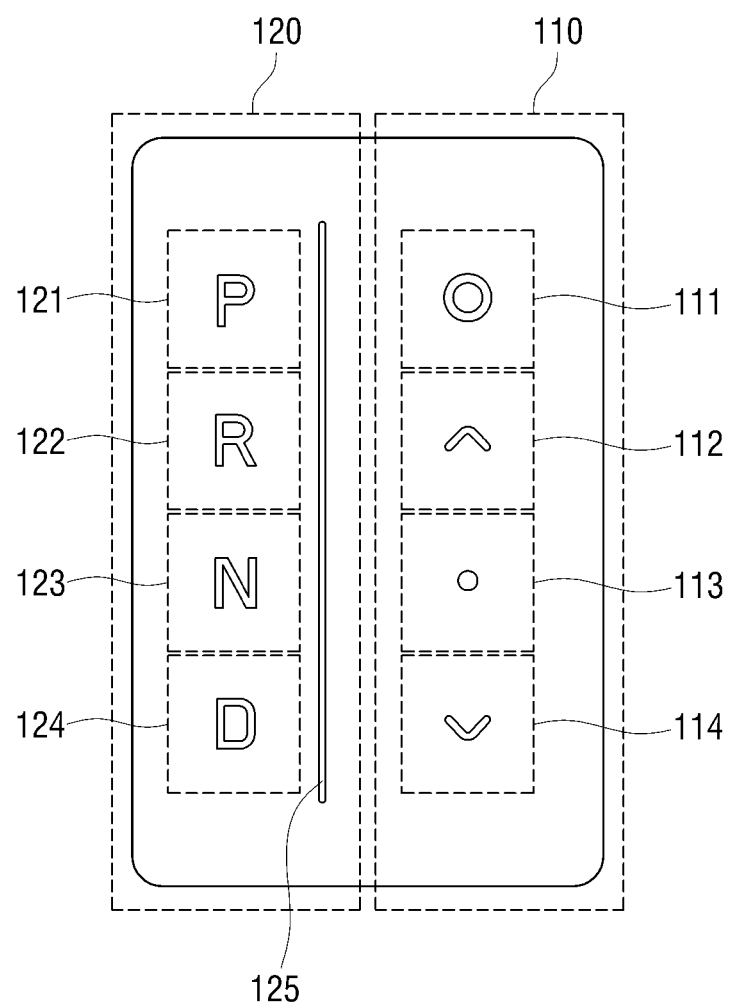
FIG. 3 is a plan view showing an external appearance of an automotive transmission according to an exemplary embodiment of the present disclosure.

FIG. 1 is a block diagram showing a configuration of an automotive transmission according to an exemplary embodiment of the present disclosure. FIG. 2 is a perspective view showing an external appearance of an automotive transmission according to an exemplary embodiment of the present disclosure. FIG. 3 is a plan view showing an external appearance of an automotive transmission according to an exemplary embodiment of the present disclosure.

Referring to FIGS. 1 to 3, an automotive transmission 1 according to an exemplary embodiment of the present disclosure may include a shift operation unit 100, a shift operation detecting unit 200, a control unit 300, and a response output unit 400. The shift operation unit 100 may allow a driver to select one of a plurality of shift stages. In the exemplary embodiment of the present disclosure, the shift stages selectable by the driver may include parking (P), reverse (R), neutral (N), and drive (D) stages, but the present disclosure is not limited thereto. The shift stages selectable by the driver may be changed variously, and at least one of the shift stages may be selected by a separate switch or button.

The shift operation unit 100 may include a plurality of touch operation units 110 and 120. Hereinafter, in the exemplary embodiment of the present disclosure, the plurality of touch operation units 110 and 120 are referred to as a first touch operation unit 110 and a second touch operation unit 120, respectively. The first touch operation unit 110 may include a plurality of touch buttons 111, 112, 113 and 114 arranged in a predetermined direction. The first touch operation unit 110 may enable selection of one of a plurality of shift stages when the driver touches at least one of the plurality of touch buttons 111, 112, 113 and 114. A predetermined image such as a symbol, a character, a pattern or the like may be displayed on each of the plurality of touch buttons 111, 112, 113 and 114. The image displayed on each of the plurality of touch buttons 111, 112, 113 and 114 may help the driver understand a touch operation method or selectable shift stages.

The first touch operation unit 110 may be operated in one of a plurality of operation modes. In the exemplary embodiment of the present disclosure, the first touch operation unit 110 may be operated in one of a first operation mode for enabling selection of a shift stage in a point touch operation (e.g., tap operation) on one of the plurality of touch buttons 111, 112, 113 and 114, and a second operation mode for enabling selection of a shift stage in a drag touch operation (e.g., swipe operation) on at least two consecutive ones of the plurality of touch buttons 111, 112, 113 and 114. However, the present disclosure is not limited thereto, and the first touch operation unit 110 may include additional operation modes.

Herein, the point touch operation may mean that a touch (e.g., tap) operation is performed on one of the plurality of touch buttons 111, 112, 113 and 114. The drag touch operation may mean that a touch operation is performed across at least two consecutive ones of the plurality of touch buttons 111, 112, 113, and 114. In the drag touch operation, the touch button at which the touch operation begins and the touch button at which the touch operation ends may be different from each other.

Figure 4:
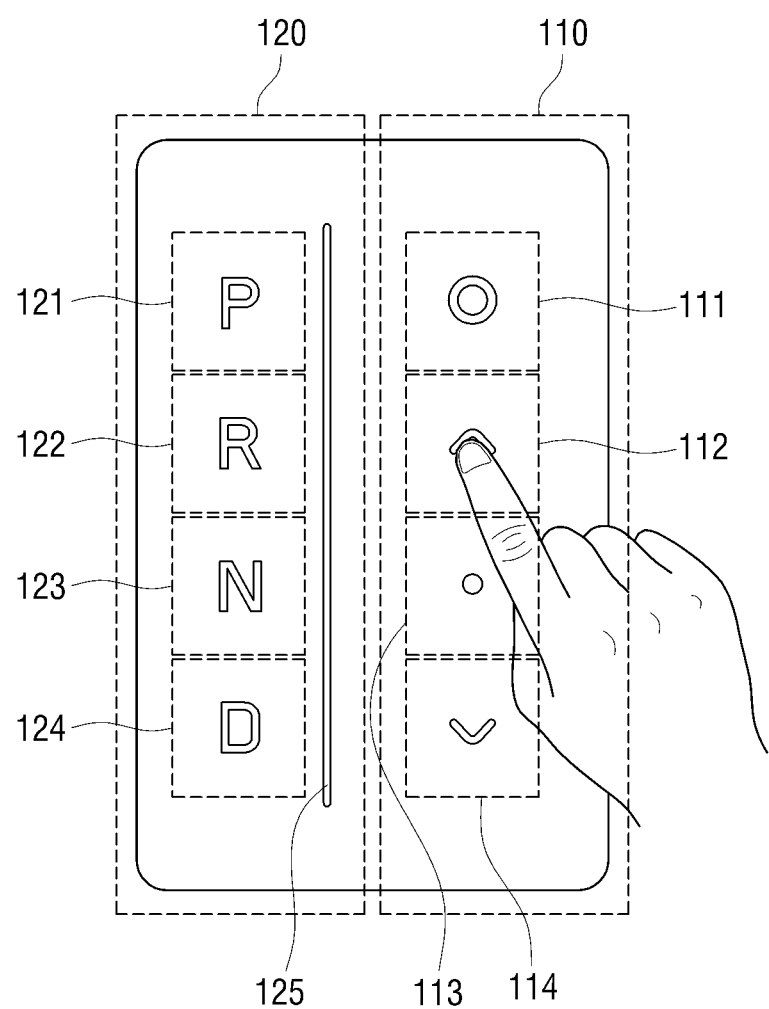
FIG. 4 is a schematic view showing a first operation mode of a first touch operation unit according to an exemplary embodiment of the present disclosure.

FIG. 4 is a schematic view showing a first operation mode of the first touch operation unit according to the exemplary embodiment of the present disclosure. Referring to FIG. 4, the first touch operation unit 110 according to the exemplary embodiment of the present disclosure may be configured such that in the first operation mode, each of the plurality of touch buttons 111, 112, 113 and 114 corresponds to each of a plurality of shift stages, and may enable selection of a shift stage that corresponds to the touch button, among the plurality of touch buttons 111, 112, 113 and 114, on which the point touch operation is performed. FIG. 4 shows an example in which a point touch operation is performed on the touch button 112 that corresponds to the R stage among the plurality of touch buttons 111, 112, 113 and 114. A desired shift stage may be selected via the point touch operation on the touch button that corresponds to each of the plurality of touch buttons 111, 112, 113 and 114. The shift stage that corresponds to each of the plurality of touch buttons 111, 112, 113 and 114 of the first touch operation unit 110 may be identified by an image displayed on each of a plurality of touch buttons 121, 122, 123 and 124 of the second touch operation unit 120 to be described later.

Figure 5:
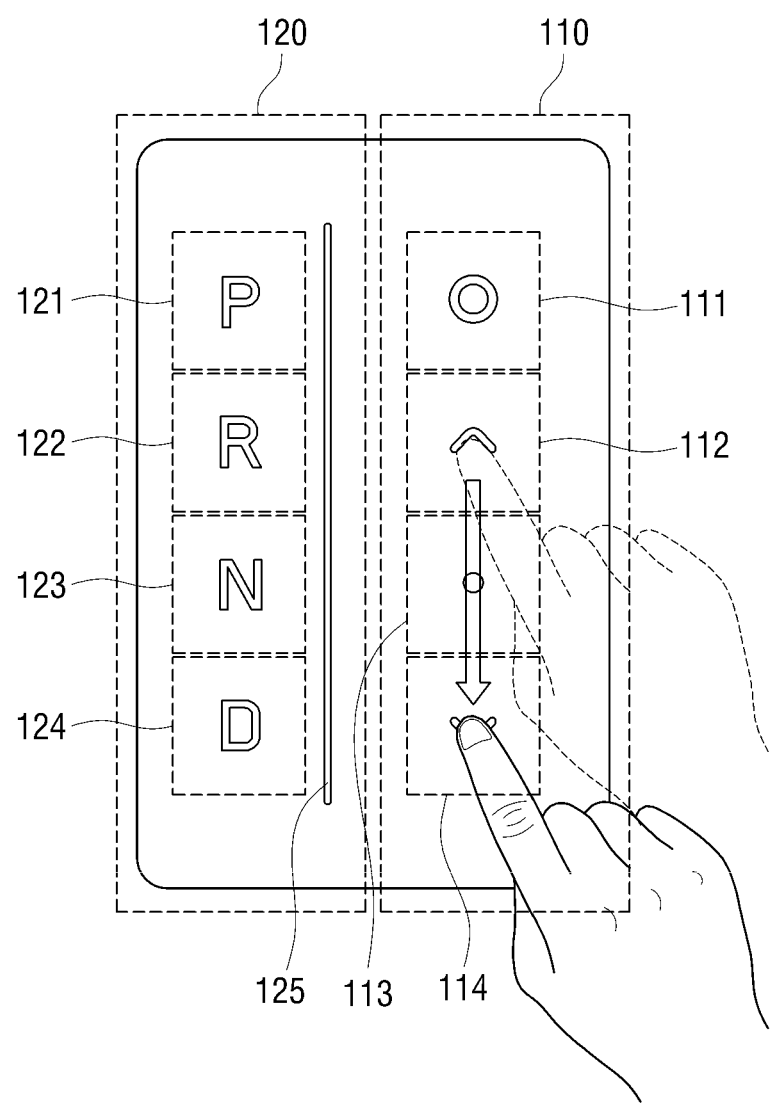
FIGS. 5 and 6 are schematic views showing a second operation mode of the first touch operation unit according to an exemplary embodiment of the present disclosure.
Figure 6:
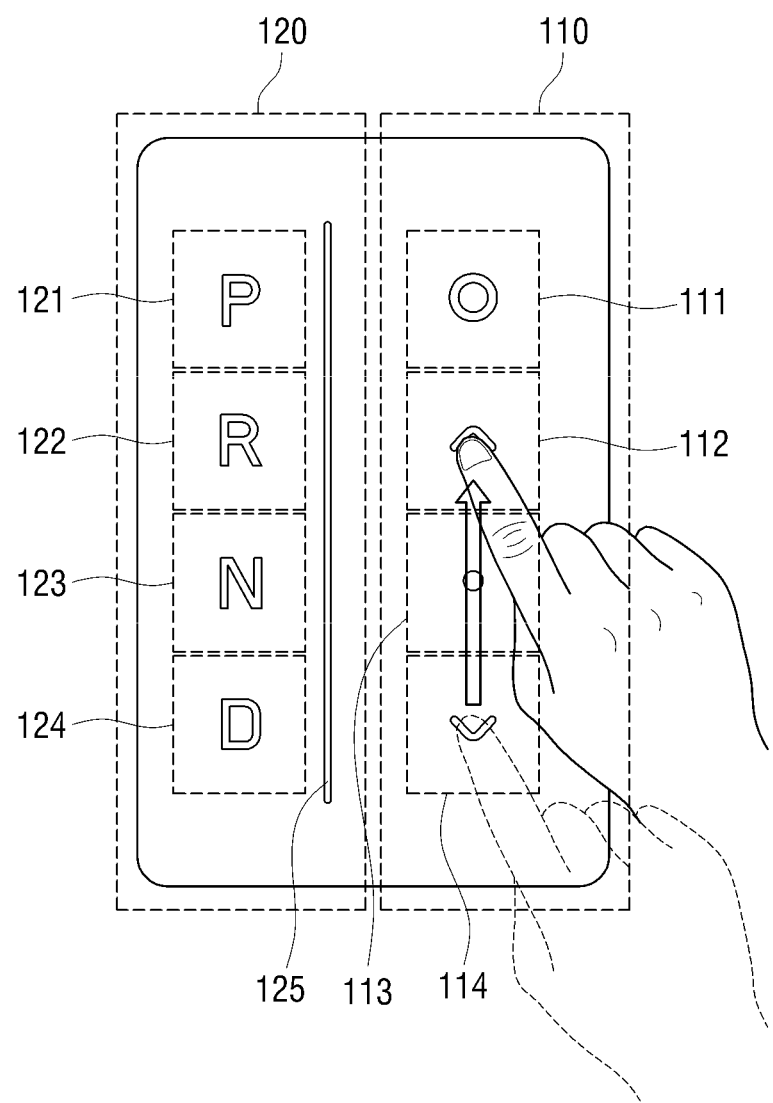

FIGS. 5 and 6 are schematic views showing a second operation mode of the first touch operation unit according to the exemplary embodiment of the present disclosure. Referring to FIGS. 5 and 6, the first touch operation unit 110 according to the exemplary embodiment of the present disclosure may be configured such that in the second operation mode, a plurality of shift stages may be selected sequentially in a predetermined order in a drag direction in a drag touch operation on at least two consecutive ones of the plurality of touch buttons 111, 112, 113 and 114.

In the exemplary embodiment of the present disclosure, since the shift stages selectable by the driver include P, R, N, and D stages, in the drag touch operation of the first touch operation unit 110 in the second operation mode, the shift stages may be selected in the order of P, R, N, and D stages or in the reverse order based on the drag direction. For example, when the current shift stage is the N stage, in the drag touch operation of the first touch operation unit 110, the D stage may be selected when the drag direction is the first direction as shown by an arrow in FIG. 5. Alternatively, the R stage may be selected when the drag direction is the second direction as shown by an arrow in FIG. 6. When the drag touch operation is performed repeatedly in the same drag direction, the shift stage that is adjacent from the current shift stage by the number of drag touch operations may be selected. Further, when the drag touch operation is performed in the same drag direction as the previous one in a state in which a last shift stage (for example, D in the first direction or P in the second direction) is selected, the last shift stage may be maintained. For example, when dragging is performed in the first direction after the D stage is selected by the dragging from the N stage in the first direction, the D stage may be maintained. Similarly, when dragging is performed in the second direction after the P stage is selected by the dragging from the R stage in the second direction, the P stage may be maintained.

Meanwhile, in the exemplary embodiment of the present disclosure, when the first touch operation unit 110 is operated in the second operation mode, the plurality of touch buttons 111, 112, 113 and 114 may be divided into the touch button 111 for enabling selection of the shift stage by the point touch operation, and the touch buttons 112, 113 and 114 for enabling selection of the shift stage by the drag touch operation. In the exemplary embodiment of the present disclosure, the touch button 111 for enabling selection of the shift stage by the point touch operation in the second operation mode may be a touch button for enabling selection of the P stage to allow the P stage to be selected quickly from the shift stages other than the P stage. However, the present disclosure is not limited thereto, and the shift stage selectable by the point touch operation in the second operation mode may be changed.

Further, in the second operation mode, the P stage may be selected by the drag touch operation in the same manner as other shift stages. In this case, the touch button 111 for enabling selection of the shift stage by the point touch operation in the second operation mode may be omitted, and all of the plurality of touch buttons 111, 112, 113 and 114 may serve to enable selection of the shift stage by the drag touch operation.

The second touch operation unit 120 may be operated in one of a first operation mode which displays the shift stages selectable by the touch operation of the first touch operation unit 110, and a second operation mode which enables selection of the shift stage by the touch operation of the driver, based on the operation state of the first touch operation unit 110. The second touch operation unit 120 may include a plurality of touch buttons 121, 122, 123 and 124 similarly to the first touch operation unit 110. In the plurality of touch buttons 121, 122, 123 and 124 of the second touch operation unit 120, similarly to the first touch operation unit 110, images may be displayed thereon to help the driver understand a touch operation method or selectable shift stages.

In the exemplary embodiment of the present disclosure, images that correspond to the shift stages selectable by the first touch operation unit 110 may be displayed on the plurality of touch buttons 121, 122, 123 and 124 of the second touch operation unit 120. Accordingly, when the driver selects the shift stage through the touch operation of the first touch operation unit 110, the shift stage that corresponds to each of the plurality of touch buttons 111, 112, 113 and 114 of the first touch operation unit 110 may be identified.

In other words, the plurality of touch buttons 111, 112, 113 and 114 of the first touch operation unit 110 and the plurality of touch buttons 121, 122, 123 and 124 of the second touch operation unit 120 may be arranged in the same direction and may be disposed side by side. In this case, the driver may identify the shift stage that corresponds to each of the plurality of touch buttons 111, 112, 113 and 114 of the first touch operation unit 110 via the image displayed on each of the plurality of touch buttons 121, 122, 123 and 124 of the second touch operation unit 120. Further, the images displayed on the plurality of touch buttons 121, 122, 123 and 124 of the second touch operation unit 120 may respectively indicate all the shift stages selectable by the first touch operation unit 110, or may indicate some shift stages, which may be selected from among a plurality of shift stages, under specific conditions.

During the operation of the vehicle, the second touch operation unit 120 may allow the image displayed on each of the plurality of touch buttons 121, 122, 123 and 124 to have a first brightness level, and allow the image corresponding to the shift stage selected by the driver to have a second brightness level, which is greater than the first brightness level to allow the driver to more easily recognize the currently selected shift stage.

The second touch operation unit 120 may be configured to allow the touch operation of the plurality of touch buttons 121, 122, 123 and 124 to be deactivated in the first operation mode and the touch operation of the plurality of touch buttons 121, 122, 123 and 124 to be activated in the second operation mode. In the exemplary embodiment of the present disclosure, the second operation mode may be an operation mode for enabling selection of the shift stage in an emergency situation, for example, when a normal operation of the first touch operation unit 110 is unavailable or difficult to achieve due to a failure or an error of the first touch operation unit 110.

Figure 7:
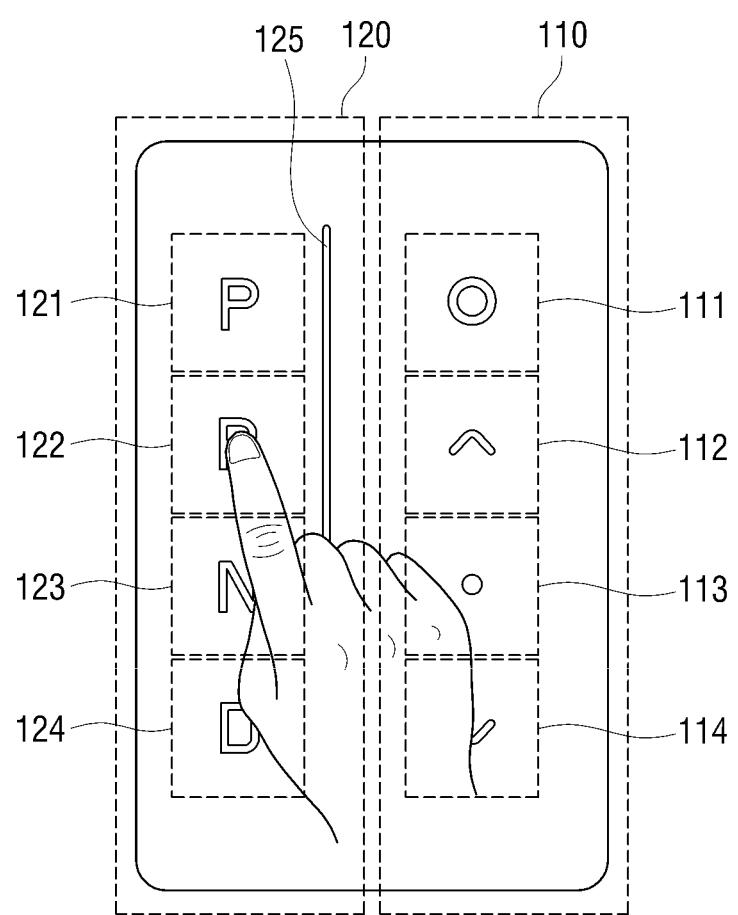
FIG. 7 is a schematic view showing a touch operation of a second touch operation unit according to an exemplary embodiment of the present disclosure.

In the exemplary embodiment of the present disclosure, since the second touch operation unit 120 serves to enable selection of the shift stage in an abnormal operation of the first touch operation unit 110, the shift stage may be selected by the point touch operation as shown in FIG. 7 to prevent an erroneous operation. However, the present disclosure is not limited thereto. Similarly to the first touch operation unit 110 described above, the second touch operation unit 120 may also enable selection of the shift stage by at least one of the point touch operation and the drag touch operation.

Meanwhile, the second touch operation unit 120 may include a light emitting unit 125 formed to extend along a direction in which the plurality of touch buttons 121, 122, 123 and 124 are arranged. Further, the light emitting unit 125 may be formed between the first touch operation unit 110 and the second touch operation unit 120. The light emitting unit 125 may generate light from a partial region that corresponds to the currently selected shift stage among the plurality of touch buttons 121, 122, 123 and 124. Further, the light emitting unit 125 may generate light in different ways based on the selection state of the shift stage. The light emitting unit 125 may be flickered when a transition to the shift stage selected by the driver is to be performed or being performed, and may be maintained in an ON state when the transition to the shift stage selected by the driver has been completed. For example, when the D stage is selected by the driver from the current shift stage of the N stage, a partial region of the light emitting unit 125 that corresponds to the D stage may be flickered during a selection-pending state of the shift stage, and a partial region of the light emitting unit 125 that corresponds to the D stage may be maintained in an ON state in a selection-complete state of the shift stage.

Figure 8:
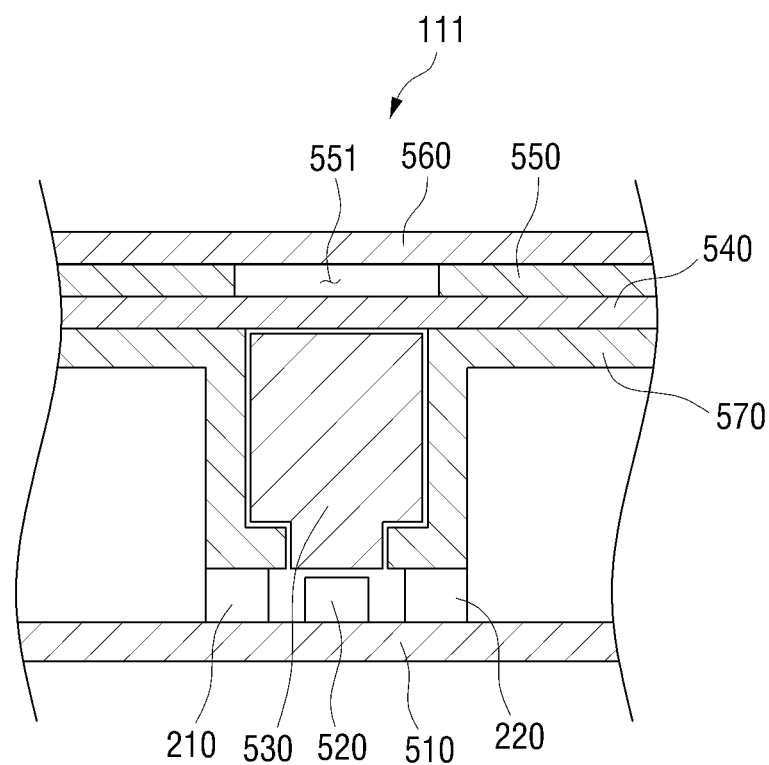
FIG. 8 is a schematic view showing a configuration of a touch button according to an exemplary embodiment of the present disclosure.

The configuration of the plurality of touch buttons 111, 112, 113 and 114 of the first touch operation unit 110 and the plurality of touch buttons 121, 122, 123 and 124 of the second touch operation unit 120 is illustrated in FIG. 8. FIG. 8 exemplarily shows the touch button 111 as one of the plurality of touch buttons 111, 112, 113 and 114 of the first touch operation unit 110, and the remaining touch buttons or the light emitting unit 125 may be similarly configured.

Referring to FIG. 8, the touch button 111 according to the exemplary embodiment of the present disclosure may include a substrate 510, a light source 520, a light guide 530, a touch film 540, an image forming portion 550, and a cover 560. At least a portion of the components 510, 520, 530, 540, 550 and 560 may be disposed to be supported by a support portion 570 of a transmission housing (not shown). The substrate 510 may supply electrical power to the light source 520 and/or control the operation of the light source 520. Light generated from the light source 520 may be guided to the image forming portion 550 by the light guide 530. The light source 520 may generate light with a plurality of brightness levels. For example, the light source 520 may generate the light at a relatively higher brightness level for the currently selected shift stage than other shift stages, and may be turned on or off based on the selection state of the shift stage.

The image forming portion 550 may include a light transmitting portion 551 having a shape that corresponds to the image displayed on the touch button 111. The image displayed on the touch button 111 may be formed by the light transmitted through the light transmitting portion 551. The touch film 540 may allow the driver to perform a touch operation. In the exemplary embodiment of the present disclosure, the touch film 540 may be of a pressure sensitive type or an electrostatic type. A transparent conductive touch film may be used as the touch film 540 to allow the light generated from the light source 520 to be transmitted through the light transmitting portion 551 of the image forming portion 550 to form an image displayed on the touch button 111. The cover 560 may be disposed on the surface of the touch button 111 to protect it from external impact or foreign substances.

In the example of FIG. 8 showing the configuration of the plurality of touch buttons 111, 112, 113 and 114 of the first touch operation unit 110 and the plurality of touch buttons 121, 122, 123 and 124 of the second touch operation unit 120, the touch film 540 of FIG. 8 may be omitted in the light emitting unit 125 since the touch operation is not performed.

In the exemplary embodiment of the present disclosure, the shift operation unit 100 may include the first touch operation unit 110 and the second touch operation unit 120. However, the present disclosure is not limited thereto, and the shift operation unit 100 may include one of the first touch operation unit 110 and the second touch operation unit 120 as necessary.

The shift operation detecting unit 200 may detect a touch operation of the driver on the plurality of touch operation units 110 and 120 described above. The shift operation detecting unit 200 may detect a point touch operation on one of the plurality of touch buttons 111, 112, 113 and 114 in the first operation mode of the first touch operation unit 110. The shift operation detecting unit 200 may detect a drag touch operation (drag direction) on at least two consecutive touch buttons of the plurality of touch buttons 111, 112, 113 and 114 in the second operation mode of the second touch operation unit 120.

The shift operation detecting unit 200 may sense a pressure applied by the driver in a touch operation on one of the plurality of touch operation units 110 and 120 to prevent an erroneous operation due to the driver's mistake (e.g., inadvertent operation) or the like. The pressure sensed by the shift operation detecting unit 200 may be used to actually select the shift stage when a pressure equal to or greater than a reference pressure is applied by the driver. In the exemplary embodiment of the present disclosure, the shift operation detecting unit 200 may include at least one pressure sensor 210 and 220 as shown in FIG. 8 to sense the pressure applied to one of the plurality of touch operation units 110 and 120. When a pressure sensitive type is used as the touch film 540, since the pressure can be sensed by the touch film 540, the at least one pressure sensor 210 and 220 may be omitted.

Meanwhile, the shift operation detecting unit 200 may detect the touch operation based on the operation mode selected by an operation mode switching unit 500, which may switch the operation mode for each of the plurality of touch operation units 110 and 120. For example, the shift operation detecting unit 200 may detect at least one of a point touch operation and a drag touch operation based on the operation mode selected by the operation mode switching unit 500 between the first operation mode and the second operation mode of the first touch operation unit 110.

The control unit 300 may determine the shift stage selected by the driver based on the detection result of the shift operation detecting unit 200, and may transmit a shift signal to the transmission to cause the shifting to the determined shift stage to be performed. Further, the control unit 300 may cause the response output unit 400 to output a response that corresponds to the shift stage selected by the driver based on the detection result of the shift operation detecting unit 200. The control unit 300 may cause a first response having a first response profile to be outputted when the pressure applied by the driver is less than the reference pressure, and cause a second response having a second response profile to be outputted when the pressure applied by the driver is equal to or greater than the reference pressure in a touch operation on one of the plurality of touch operation units 110 and 120. The first response and the second response may be outputted based on the selection state of the shift stage as shown in FIG. 9.

The first response may indicate the selection-pending state of the shift stage in which the selection of the shift stage is not actually performed, and the driver may recognize the shift stage selected by the driver. Accordingly, the driver may confirm the selected shift stage before the actual shifting of the shift stage is performed. In other words, the first response may serve to inform the driver of the selection-pending state of the shift stage selected by the driver. The driver may verify whether the selected shift stage matches the desired shift stage via the first response before the actual selection of the shift stage is performed. Thus, the driver may cancel the touch operation or select an appropriate shift stage in an erroneous operation due to the driver's mistake or the like.

Figure 10:
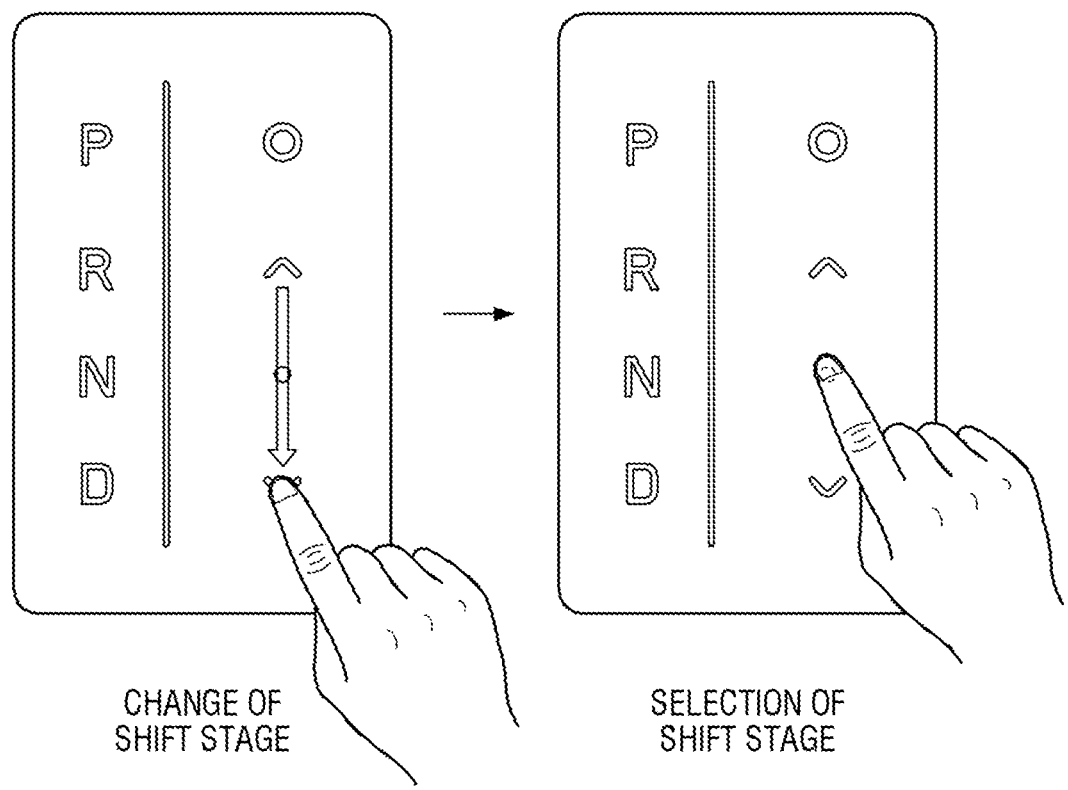
FIG. 10 is a schematic view showing a shift operation of a second touch operation unit according to an exemplary embodiment of the present disclosure.

The second response may notify that the shift stage selected by the driver has been actually selected when a pressure equal to or greater than the reference pressure is applied by the driver after the first response output. For example, when the first touch operation unit 110 is operated in the first operation mode, the control unit 300 may control to allow the selection of the shift stage to be actually performed when a pressure equal to or greater than the reference pressure is applied in a point touch operation on one of the plurality of touch buttons 111, 112, 113 and 114. When the first touch operation unit 110 is operated in the second operation mode, the control unit 300 may control such that the selection of the shift stage is actually performed when a point touch operation of a reference pressure or more is performed on one of the plurality of touch buttons 111, 112, 113 and 114 after a desired shift stage is selected by a drag touch operation on one of the plurality of touch buttons 111, 112, 113 and 114 as shown in FIG. 10.

In other words, when a pressure equal to or greater than the reference pressure is applied in a touch operation on one of the plurality of touch operation units 110 and 120, the control unit 300 may determine that it is a touch operation for the actual selection of the shift stage. The control unit 300 may cause the second response having the second response profile to be outputted and, simultaneously, may cause the shift signal for selection of the shift stage to be outputted to the transmission.

Meanwhile, when the second touch operation unit 120 is operated in the second operation mode, i.e., when a normal operation is difficult or unavailable due to a failure or an error of the first touch operation unit 110, the control unit 300 may cause the first response having the first response profile or the second response having the second response profile to be outputted based on the magnitude of the pressure applied to the second touch operation unit 120, similarly to the first touch operation unit 110 described above.

The first response profile may define the attributes of the first response, and the second response profile may define the attributes of the second response. The first response profile and the second response profile may have different attributes based on the selectable shift stages. The first response profile and the second response profile for the same shift stage may have the same or different attributes. Accordingly, the driver may identify completion of the selection to the desired shift stage via the second response after verifying whether the desired shift stage matches the shift stage to be selected via the first response.

In the exemplary embodiment of the present disclosure, the first response and the second response may include at least one of vibration, sound, voice, and any combination thereof. The first response profile and the second response profile may include the attributes such as the magnitude of vibration, the period of vibration, the type of sound, and the magnitude of sound, which are defined differently based on each shift stage. Accordingly, the driver may verify the shift stage to be selected via the first response without visually verifying the selected shift stage. Thus, it is possible to prevent or reduce not only the driver's erroneous operation, but also a vehicle accident or the like which may occur when forward observation is neglected to visually verify the shift stage. Meanwhile, after the first response output, when a pressure equal to or greater than the reference pressure is not applied by the driver within a predetermined period of time, the controller 300 may determine that the driver does not intend to change the shift stage or that it is an erroneous operation, and may cause the previous shift stage to be maintained.

The response output unit 400 may output either the first response or the second response that corresponds to the selected shift stage under the control of the control unit 300. The response output unit 400 may include a response output means such as a voice coil motor (VCM), a vibration motor, a diaphragm, a speaker, and the like, corresponding to a recognition means based on the attributes of the first response and the second response of the response output unit 400. However, the present disclosure is not limited thereto, and the response output unit 400 may include various response output means based on the type of the response outputted from the response output unit 400.

As described above, in the automotive transmission 1 according to the present disclosure, the shift stage may be selected by the touch operation of the driver, thereby allowing a more effective utilization of a vehicle interior space. By outputting different responses based on the pressure applied by the driver, an erroneous operation due to the driver's mistake may be prevented.

In concluding the detailed description, those skilled in the art will appreciate that many variations and modifications may be made to the exemplary embodiments without substantially departing from the principles of the present disclosure. Therefore, the disclosed exemplary embodiments of the present disclosure are used in a generic and descriptive sense only and not for purposes of limitation.

What is claimed is:
1. An automotive transmission comprising:
a shift operation unit including a touch operation unit having a plurality of touch buttons;
a shift operation detector configured to detect a touch operation on the touch operation unit;
an operation mode switcher configured to enable switching between a first operation mode and a second operation mode to allow the touch operation unit to be operated for a touch operation in one of the first operation mode and the second operation mode; and a controller configured to determine a shift stage based on the detected touch operation, wherein the first operation mode enables selection of one of a plurality of shift stages when a point touch operation is performed on one of the plurality of touch buttons, and the second operation mode enables selection of one of the plurality of shift stages when a drag touch operation is performed on at least two consecutive touch buttons of the plurality of touch buttons.

2. The automotive transmission of claim 1, wherein, in the second operation mode, the touch operation unit changes the shift stage by the drag touch operation, and causes the changed shift stage to be selected in response to the point touch operation on one of the plurality of touch buttons.

3. The automotive transmission of claim 1, wherein, in the second operation mode, the plurality of touch buttons include a first touch button that enables selection of the shift stage by the point touch operation and a second touch button that enables selection of the shift stage by the drag touch operation.

4. The automotive transmission of claim 1, wherein the controller causes a response that corresponds to the determined shift stage to be outputted.

5. The automotive transmission of claim 4, wherein the response includes at least one of vibration, sound, and voice.

6. The automotive transmission of claim 4, wherein the controller causes a first response to be outputted when a pressure applied to the touch operation unit is less than a reference pressure and causes a second response to be outputted when the pressure applied to the touch operation unit is equal to or greater than the reference pressure.

7. The automotive transmission of claim 6, wherein the first response indicates a selection-pending state of the shift stage, and the second response indicates a selection-complete state of the shift stage.

8. The automotive transmission of claim 6, wherein each of the first response and the second response has a different response profile based on each of the plurality of shift stages.

9. The automotive transmission of claim 6, wherein the first response and the second response have different response profiles for a same shift stage.

10. The automotive transmission of claim 6, wherein the first response and the second response have a same response profile for a same shift stage.

11. The automotive transmission of claim 6, wherein the shift operation detector includes at least one pressure sensor configured to sense the pressure applied to the touch operation unit.

12. An automotive transmission comprising:

a shift operation unit that includes a plurality of touch operation units;

a shift operation detector configured to detect a touch operation on one of the plurality of touch operation units; and a controller configured to determine a shift stage based on the detected touch operation, wherein the plurality of touch operation units include:

a first touch operation unit configured to enable selection of one of a plurality of shift stages by at least one operation mode; and a second touch operation unit configured to operate in one of a first operation mode for displaying shift stages selectable by the first touch operation unit and a second operation mode for enabling selection of one of the plurality of shift stages.

13. The automotive transmission of claim 12, wherein the first touch operation unit includes a plurality of touch buttons, and wherein the at least one operation mode includes:

a first operation mode for enabling selection of one of a plurality of shift stages when a point touch operation is performed on one of the plurality of touch buttons; and a second operation mode for enabling selection of one of the plurality of shift stages when a drag touch operation is performed on at least two consecutive touch buttons of the plurality of touch buttons.

14. The automotive transmission of claim 12, wherein the second touch operation unit is operated in the first operation mode in a normal operation of the first touch operation unit and operated in the second operation mode in an abnormal operation of the first touch operation unit.

15. The automotive transmission of claim 12, wherein the second touch operation unit is configured to allow a touch operation to be deactivated in the first operation mode and a touch operation to be activated in the second operation mode.

16. The automotive transmission of claim 12, wherein the second touch operation unit includes a plurality of touch buttons, and wherein the controller is configured to enable selection of one of the plurality of shift stages in a point touch operation on one of the plurality of touch buttons.

17. The automotive transmission of claim 12, wherein the second touch operation unit includes a light emitting unit, and the light emitting unit generates light from a region that corresponds to a shift stage selected by one of the first touch operation unit and the second touch operation unit.

18. The automotive transmission of claim 12, wherein the controller causes a response that corresponds to the determined shift stage to be outputted.

19. The automotive transmission of claim 18, wherein the response includes at least one of vibration, sound, and voice.

20. The automotive transmission of claim 18, wherein the controller causes a first response to be outputted when a pressure applied to one of the first touch operation unit and the second touch operation unit is less than a reference pressure and causes a second response to be outputted when the pressure applied is equal to or greater than the reference pressure.

21. The automotive transmission of claim 20, wherein each of the first response and the second response has a different response profile for each of the plurality of shift stages.

22. The automotive transmission of claim 20, wherein the first response and the second response have different response profiles for a same shift stage.

23. The automotive transmission of claim 20, wherein the first response and the second response have a same response profile for a same shift stage.

24. The automotive transmission of claim 20, wherein the first response indicates a selection-pending state of the shift stage, and the second response indicates a selection-complete state of the shift stage.

25. The automotive transmission of claim 20, wherein the shift operation detector includes at least one pressure sensor configured to sense the pressure applied to the first touch operation unit or the second touch operation unit.

* * * * *